United States Patent [19]

Skagerlund

[11] Patent Number: 4,903,602
[45] Date of Patent: Feb. 27, 1990

[54] PROXIMITY FUSE

[75] Inventor: Lars-Erik Skagerlund, Karlskoga, Sweden

[73] Assignee: Aktiebolaget Bofors, Bofors, Sweden

[21] Appl. No.: 205,247

[22] Filed: Jun. 10, 1988

[51] Int. Cl.⁴ .......................... F42C 13/02; F42C 13/04
[52] U.S. Cl. ...................................... 102/213; 102/214
[58] Field of Search ................................ 102/213, 214

[56] References Cited

U.S. PATENT DOCUMENTS

| | | | |
|---|---|---|---|
| 2,925,965 | 2/1960 | Pierce | 102/213 |
| 3,793,958 | 2/1974 | Holt et al. | 102/213 |
| 3,911,438 | 10/1975 | Banks | 102/214 |
| 4,015,530 | 4/1977 | Dick | 102/213 |
| 4,245,560 | 1/1981 | Rambauske | 102/213 |

FOREIGN PATENT DOCUMENTS 208050 2/1986 Sweden .

Primary Examiner—Charles T. Jordan
Attorney, Agent, or Firm—Pollock, Vande Sande & Priddy

[57] ABSTRACT

A proximity fuse for a launchable unit, for example a missile, includes transmitters for emitting optic radiation in a plurality of narrow part lobes, and receivers for receiving optic radiation emitted through the part lobes and reflected from a target towards which the unit is homing in. The receivers are enabled to discern reflecting radiation derived from each respective part lobe from the radiation emitted and reflected from other part lobes. The radiation derived from each respective part lobe is processed individually in the receiver.

53 Claims, 4 Drawing Sheets

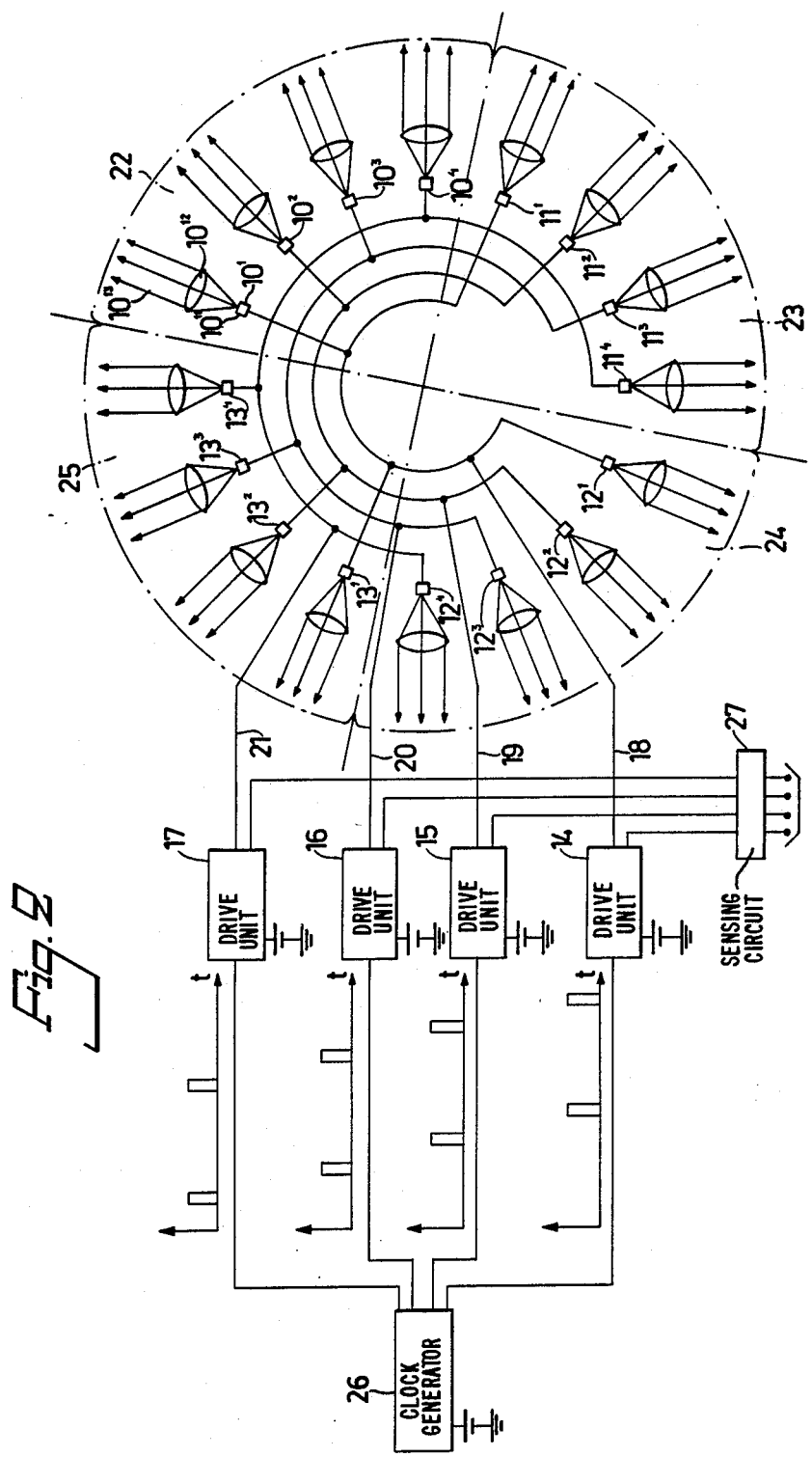

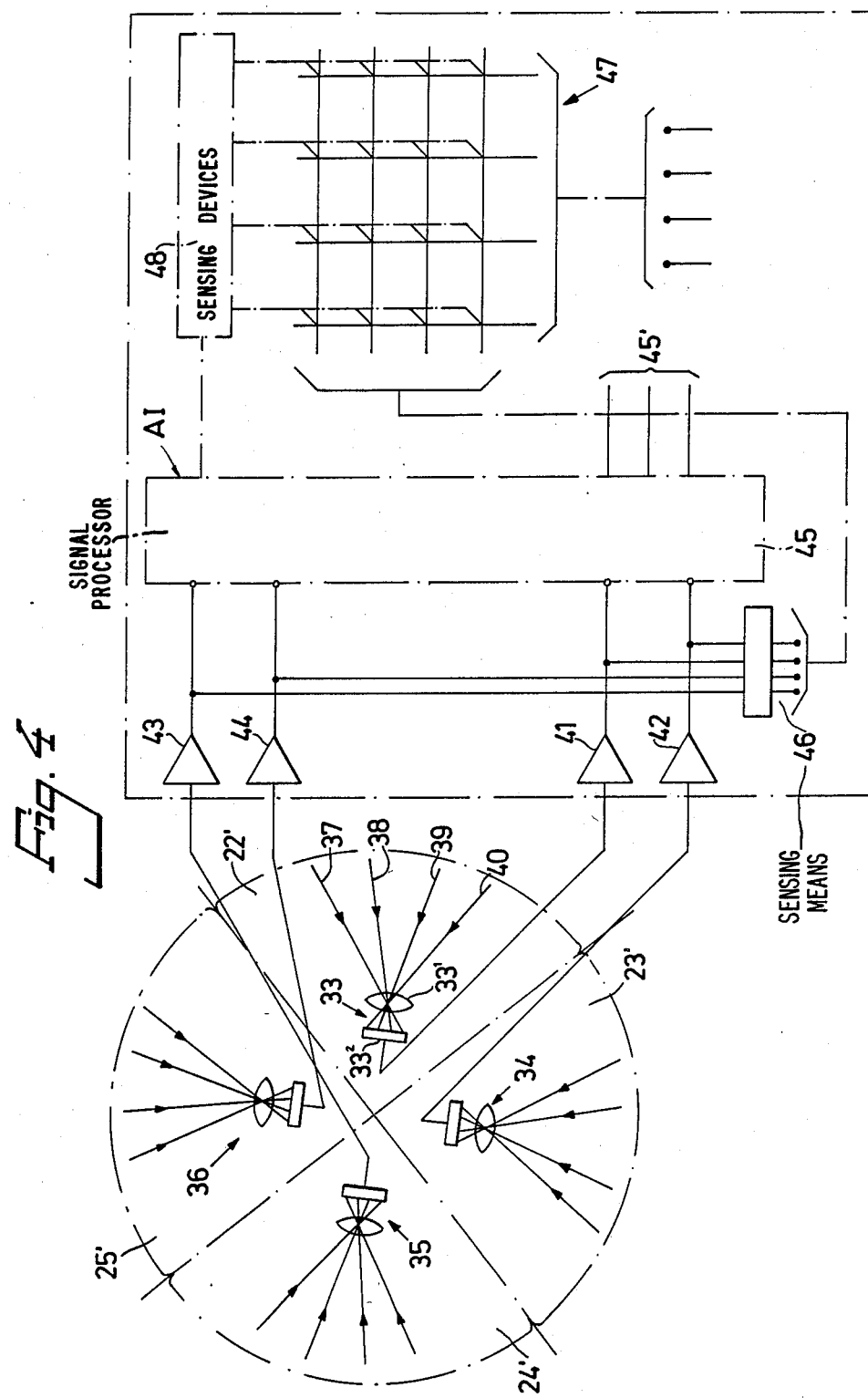

PROXIMITY FUSE

TECHNICAL FIELD

The present invention relates to a proximity fuse for a unit in the form of a missile, projectile or corresponding unit. Such a unit may include a warhead and a sensing device which detonates the warhead when the unit hits its target. The purpose of the proximity fuse is to detonate the warhead on target passage in those cases where no direct hit is obtained.

SUMMARY OF THE INVENTION

The proximity fuse includes means for emitting electromagnetic radiation, and means for receiving such reflected radiation from the target when it is bypassed. In addition, the proximity fuse includes means for signal processing of the signal initiated by the received radiation. The signal processing may include filtration and other measures to highlight, as far as is possible, the signal reflected by the target in relation to background noise and annoying chatter, and also testing in relation to predetermined criteria. If the signal satifies these criteria, the warhead is detonated. The criteria are selected such that the probability of detonation by background noise and annoying chatter will be as slight as possible, and the probability of detonation by radiation reflected from the target will be as high as possible. In the present invention, it is assumed that such signal processing and criteria assessment are effected in accordance with known methods.

BACKGROUND ART

In this art, it is desirable that the proximity fuse does not detonate the warhead in cases which offer a direct hit on the target. Consequently, prior-art proposals have been put forward to give one and the same lobe for the emitted electromagnetic radiation the configuration of a planar disc with the normal directed in the flight path of the unit or alternatively the form of the circumferencial surface of a cone. It is further desirable in this art to employ short wave electromagnetic radiation - preferably within the IR range - such that unwieldy antenna clusters will be thus avoided. The drawback inherent in the prior-art IR radiation is that it is greatly reflected by the water droplets and ice crystals which are present in cloud and in precipitation. The conditions will become particularly unfavourable for proximity fuses of the above-mentioned disc or conical ray lobe under these circumstances. On target by-pass, or "near miss", but a minor faction of the radiation lobe will impinge upon the target, which entails that the emitted radiation must be given a high efficiency level in order that a reflected signal of sufficient strength be received. On passage through cloud or precipitation, the entire radiation lobe will be subject to "window effect" from the reflection of water droplets or ice crystals. As a result of the extent of the radiation lobe about the circumference of the launchable unit, and the high emitted effect, the reflected effect, i.e. the return dispersion, will be very high indeed.

OBJECT OF THE PRESENT INVENTION

The object of the present invention is to obviate the above-mentioned drawbacks. In addition to the fact that sensitivity to cloud, mist, fog and precipitation may be reduced considerably, the present invention also makes for an improved detection of a target in that it is possible, with the assistance of the reflected radiation in the part lobes, to present a rough picture of the configuration of the target. Using this aid, it is possible, in turn, to realize an optimum detonation delay in the unit such that the unit may be detonated adjacent a vulnerability center on the target.

The present invention is based on a division of the conical or disc-shaped transmitter and receiver lobes into part lobes, and that which may be considered as characterizing the present invention is that the transmitter and receiver are arranged such that their part lobes will be so narrow, so many in number, and so densely arranged that, on target by-pass, at least one part lobe will impinge in its entirety upon the target, and that the signal processing is arranged such that reflected radiation is processed separately for each part lobe.

In one preferred embodiment of the present invention, the large number of part lobes will be obtained with a relatively small cluster of components. For each part lobe, there is provided a transmitter of simple construction which is intermittently activated in the form of brief pulses. Furthermore, there is provided a number of receivers (n) which are arranged such that each receiver device is common to a number of transmitters (m).

The transmitters may be grouped in two different ways. When the transmitters are divided in accordance with the first method, these transmitters, in one and the same group, are pulsed simultaneously from one and the same pulse assembly or from a plurality of such synchronous assemblies, and that each one of these transmitter units is provided with its receiver unit. When the transmitter units are divided up according to the second method, according to the invention, the transmitter units within one and the same group utilize one and the same receiver unit; each of these transmitter units is pulsed from its respective pulse unit; and the different transmitter units are pulsed at non-coincidental points in time.

In a first embodiment of the present invention, activation of the transmitter unit is effected electrically, laser diodes or other pulsable sources of radiation being used in the transmitter means. In an alternative embodiment, transmission between the drive means and transmitter means may be effected fiber-optically, in which event the radiation sources are integrally built with the pulse assemblies.

The receiver units are each coupled to their subsequent signal processing units. Each respective receiver unit is allocated its second transmitter means group, the transmitter and receiver units within these groups being directed in substantially the same direction.

By utilizing a matrix sensing function, it is possible to establish, at any given moment, the part lobe association for each respective received optical radiation.

The number of transmitters (m $\times$ n) substantially exceeds the number of receiver units. The number of drive units (m) preferably corresponds to the number of receiver units (n).

As a result of the above-proposed construction of the proximity fuse, it is possible to obtain a function in which the return dispersion is considerably reduced. The employment of a plurality of narrow part lobes and the separate signal processing of the signal from each part lobe prevents the return dispersion in the part lobes of each respective sector from being accumulated.

The present invention may be employed together with prior-art range finding principles and per se known subsequent signal processing which utilizes the range information from the different part lobes to effectuate a rough picture of the target and calculate therefrom the optimum triggering delay for the unit.

BRIEF DESCRIPTION OF THE DRAWINGS

A currently proposed embodiment of a proximity fuse displaying the significant characterizing features of the present invention will be described in greater detail below with the reference to the accompanying drawings.

In the accompanying drawings:

FIG. 2 shows, in schematic diagram form, transmitter units included in the transmitter of the proximity fuse, and drive units for these transmitters;

FIG. 4 shows receiver units included in the receiver and signal processing stages operative subsequent to these units.

DESCRIPTION OF PREFERRED EMBODIMENT

Figure 1:
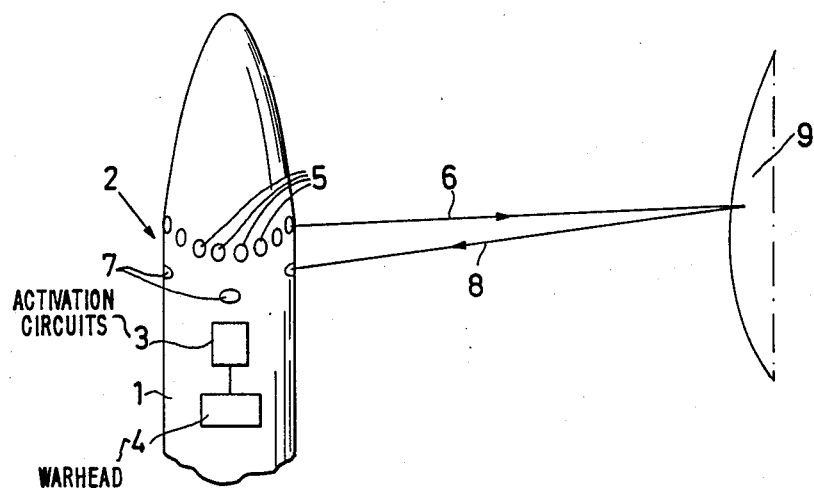
FIG. 1 shows the fundamental siting of the proximity fuse on a missile or the like and the position of the missile in relation to the target.

Referring to the drawings, FIG. 1 shows part of a missile indicated by reference numeral 1. The missile includes a proximity fuse section 2 which is housed in the missile in a per se known manner. The missile is provided with activation circuits 3 actuable by the proximity fuse, by means of which circuits the warhead 4 of the missile may be triggered or detonated.

In FIG. 1, the transmitters of the proximity fuse are symbolized by a number of output openings 5 through which a plurality of narrow lobes 6 of optic radiation may be transmitted. The receiver of the proximity fuse is symbolized by a number of input openings 7 which may be exposed to optic radiation 8 derived from the optical radiation emitted in part lobe form and reflected from a target 9.

In accordance with the disclosures presented below, the number of transmitter devices is greater than the number of receiver devices, and one and the same input opening 7 constitutes the receiver input for the radiation from a plurality of output openings 5.

The transmitter according to FIG. 2 shows a number of transmitter devices for optic radiation and are designated $10^1 \ldots 10^4$; $11^1 \ldots 11^4$; $12^1 \ldots 12^4$; and $13^1 \ldots 13^4$.

Each respective transmitter device includes a per se known laser diode $10^{11}$ with associated collecting lens $10^{12}$. From each respective transmitter device, there departs a narrow part lobe $10^{13}$.

The proximity fuse is an all-round sensor, which entails that the part lobes together cover the entire circumference of the proximity fuse (the missile). In the general case, there should be provided a plurality (m × n) of transmitters. In the illustrated embodiment, the transmitter devices are 16 in number.

The transmitter devices may be divided into groups in two different manners, hereinafter designated first and second groups. Both the first and second groups are four in number. However, the number of groups may be varied.

The transmitter devices $10^1$, $11^1$, $12^1$, $13^1$ form a first group. The transmitter devices $10^2$, $11^2$, $12^2$, $13^2$ form a second first group. The transmitter devices $10^3$, $11^3$, $12^3$, $13^3$; and $10^4$, $11^4$, $12^4$ and $13^4$ form the third and fourth first groups.

The transmitter devices $10^1$, $10^2$, $10^3$, $10^4$ form a first second group. The transmitter devices $11^1$, $11^2$, $11^3$, $11^4$ form a second second group. The transmitter devices $12^1$, $12^2$, $12^3$, $12^4$; and $13^1$, $13^2$, $13^3$, $13^4$ form a third and fourth second group, respectively.

The transmitter devices in each respective first group are energized from their drive unit 14, 15, 16 and 17, respectively. Energization from the drive unit 14 of the first first group is effected through electric lines 18. The drive units 15, 16 and 17 correspondingly energize their first groups by the intermediary of electric lines 19, 20 and 21.

The transmitter devices included in each respective second group each cover their sector 22, 23, 24 and 25.

The above-mentioned drive units 14–17 are controlled by a clock generator 26 which emits four parallel pulse trains for controlling each respective drive unit. In accordance with the figure, the pulses/pulse trains are offset in relation to one another, such that the transmitter units within each respective second group are actuated in series from their respective drive unit. Activation from the drive units is, in this instance, such that the activation of one transmitter device in question within the group is initiated and terminated before activation of subsequent transmitter devices is effected and so on. As a result of the illustrated construction, activation will be effected simultaneously of one transmitter device in each respective group. The simultaneously activated transmitter devices are, in this instance, directed substantially away from one another and, in the illustrated embodiment, all activated transmitter devices are arranged at 90° in relation to one another.

The drive units may be constructed in a per se known manner by digital technology (flipflops, gates, etc.). The clock generator 26 may also consist of a per se known digital generator. The pulses in the pulse train from the clock generator are of the same amplitude and the mutual offset between the pulse trains may be arranged by previously known frequency distribution circuits in the clock generator. In one embodiment, the pulse frequency is at most but a few kHz and the pulse time in each respective pulse train is shorter than 1 microsecond. Power supply is obtained in a per se known manner from a power source in the unit/missile.

As a result of the illustrated arrangement, full-circle scanning may be obtained; at the same time, return dispersion can be kept at a low level despite the relatively high total transmission power which is necessary to give the desired triggering effect of the emitted radiation reflected from the target. By the series, or successive, activation of the transmitter devices within each respective second group, cumulative effects of the return dispersion will be avoided.

The number (m) of drive units is selected in dependence upon the number of first and second groups, respectively, and is preferably equal to the latter in number. In FIG. 2, a sensing circuit 27 is also connected to outputs on the drive units. The sensing circuit is intended to give an indication of that drive unit of the above-mentioned drive units which is activated at any given time.

Figure 3:
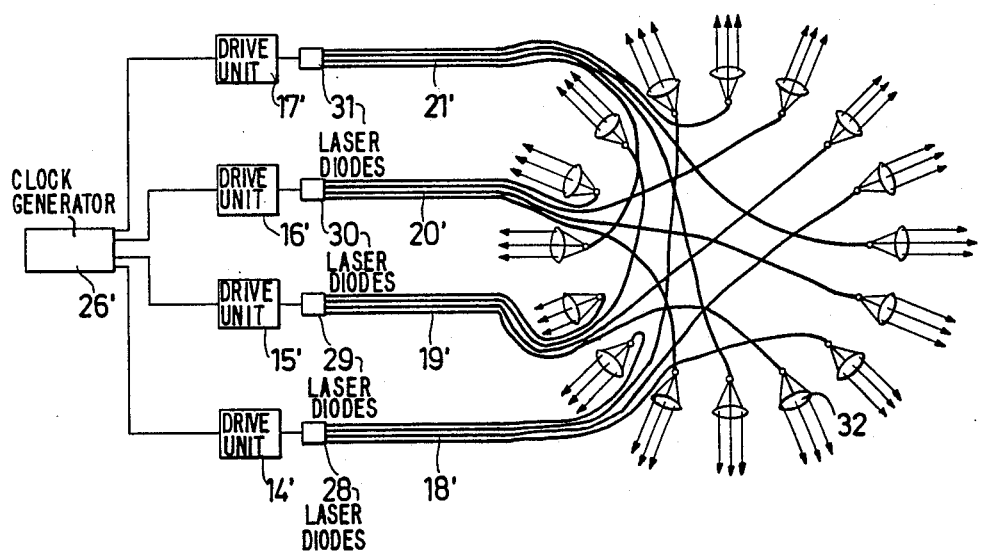
FIG. 3 shows an alternative embodiment of the transmitter according to FIG. 2.

FIG. 3 shows an alternative embodiment of the transmitter. In this case, use is made of fiber optic leads 18', 19', 20' and 21', instead of the electric leads 18, 19, 20 and 21 in FIG. 2. Electronic drive units 14', 15', 16' and 17' are also included in this particular embodiment and are driven by a digital clock generator 26' in a manner corresponding to that according to the embodiment of FIG. 2. The drive units 14'-17' are connected to LEDs or laser diodes 28, 29, 30 and 31, respectively. The ends of the fibre optic leads facing away from the above-mentioned transmitter units 28-31 are disposed at collecting lenses 32 of the same type as in the previously-described embodiment. The group arrangement and departing part lobes are disposed in a manner corresponding to that described in conjunction with the embodiment according to FIG. 2.

Each respective now departing part lobe passes its associated opening 5 on the missile according to FIG. 1. The lens of the part lobe is disposed at each respective opening.

FIG. 4 shows the receiver unit in the proximity fuse seen in a cross-sectional plane through the missile or the like. In the figures, the sectors disclosed in FIG. 2 have also been included, having there been given the designations 22', 23', 24' and 25', respectively. The receiver comprises four receiver units 33, 34, 35 and 36 each covering its respective sector of the incoming reflected radiation.

Each respective receiver device displays a collimator lens $33^1$ and a photodetector $33^2$. The receiver devices 33-36 are arranged so as to cooperate with transmitter devices in each respective second group. Hence, the receiver device 33 may react to radiation transmitted by the transmitter devices $10^1$, $10^2$, $10^3$, $10^4$ and reflected from the actual target. Correspondingly, the receiver device 34 may react to transmitted radiation from the transmitter devices $11^1$, $11^2$, $11^3$, $11^4$ and reflected from the target, and so on. In FIG. 4, the radiation from each respective part lobe has been indicated. Thus, the received lobe 37 represents reflected radiation from the part lobe of the transmitter device $10^1$. The incoming radiation 38, 39 and 40, respectively represents reflected radiation from the part lobes of the transmitter devices $10^2$, $10^3$ and $10^4$. This incoming radiation 37-40 occurs successively in time sequence after one another. The lenses of the receivers are disposed at the openings 7 on the missile according to FIG. 1.

The photodetectors in each respective receiver 33-36 are each connected to their respective amplifiers 41-44. The outputs of the amplifiers are connected to a signal processing circuit 45 which processes received information in a per se known manner. The outputs of the amplifier circuits 41-44 are connected to sensing means 46. The sensors 27 of the transmitter devices and the sensors 46 of the receivers may, in one embodiment, be connected to a sensing matrix 47 to whose columns the outputs of the sensing circuit 27 are connected and to whose lines the outputs of the sensing circuit 46 are connected. Further sensing devices 48 are connected to the interstices in the matrix and, from the illustrated matrix sensing, it is possible to obtain, in the circuit 48, information as to that part lobe from which received radiation derives on each occasion. Together with the range information A1, it is possible, using the calculator circuits signal processor 45, to obtain a rough outline image of the target and derive therefrom optimum warhead triggering delay. Thus, it is possible, from the signal processing circuits, to obtain on one output, for instance output 45', a signal/signals for activating the triggering circuits 3 (see FIG. 1) in the missile.

The lobe angles are selected to be so narrow that an individual lobe will, in its entirety, be accommodated on a smallest target which could be detectable even when the target is at the maximum detection range. The distribution angles between the different lobes are selected to be so small that one lobe always impinges upon the smallest target which it is possible to detect when it is at the maximum detection range.

The lobe angles are suitably selected within the order of magnitude of between 5° and 45°, preferably within the range of between 5° and 30°. The transmitter and receiver devices may be disposed such that the lobes may or may not mutually overlap.

As a result of the above-disclosed construction, the radiation of each respective part lobe reflected on the target and received in the missile may be identified and individually treated in relation to the radiation deriving from other part lobes.

Figure 5:
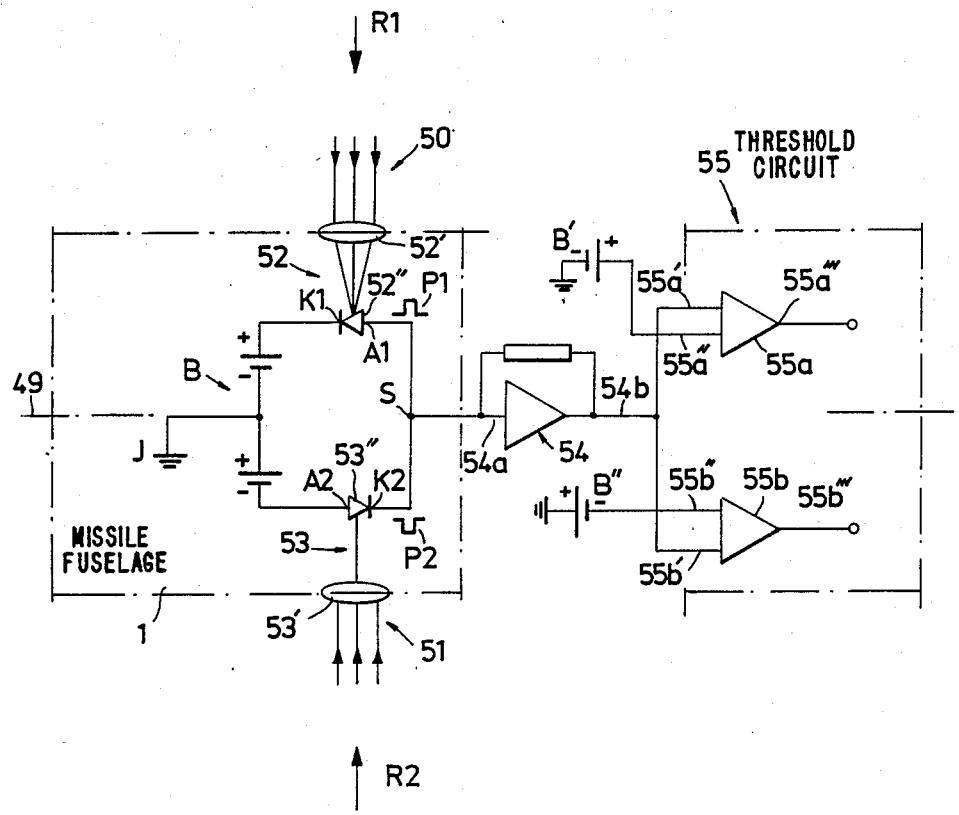
FIG. 5 is a schematic side elevation showing the application of the receiver in a missile body.

In FIG. 5, the missile fuselage is indicated by reference numeral 1 and its center axis by reference numeral 49. The missile is fitted with a proximity fuse and here is illustrated only the receiving parts. Hence, the transmitter means of the proximity fuse are not shown, it being presupposed that they are of such type as to emit the electromagnetic radiation in the form of narrow part lobes which, together, cover the entire circumference of the missile so that the emitted optical energy radiates outwardly in full circle. The number of part lobes may vary without in any manner effecting the inventive concept of the principles for receptive function as described in the following presentation.

In the Figure, two received strobes 50 and 51 are shown, these having been emitted from the emitter devices and reflected on a target (not shown).

The receiver in the proximity fuse/missile is divided into at least two receiver units 52 and 53, the first receiver unit being intended to receive the first strobe 50 which impinges upon the missile, in a direction R1, and the second receiver 53 is intended to receive the strobe 51 which impinges in a direction R2. In the illustrated embodiment, the directions R1 and R2 are diametrically opposed to one another. Generally however, the present invention functions for other mutual angles of incidence between the directions R1 and R2. The requirement is that the receivers must be directed in such a manner away from one another that the one receiver is not capable of receiving the part lobe of the other receiver when, it is reflected on its largest imaginary target.

Each respective receiver unit includes a collimator lens 52' and 53', respectively, and a photodetector 52" and 53", respectively. The anode A1 in the first detector 52" is interconnected, at a junction point S, with the cathode K2 in the detector 53". The cathode K1 in the detector 52", is coupled to plus potential and the anode A2 in the detector 53" is coupled to minus potential. These potentials are obtained from a battery B in the unit, this battery being grounded at J.

As a result of the illustrated interconnection of the detectors 52" and 53", activation of the receiver units 52 and 53 will generate pulses P1 and P2, respectively, of different signs. In that but a single lobe is reflected on one and the same occasion in the target, the pulses P1 and P2 cannot occur simultaneously.

An operational amplifier 54 of per se known type is connected, with its input 54a, to the above-mentioned interconnection point S. The output 54b of the operational amplifier is, in its turn, connected to a threshold circuit 55. This latter includes two threshold devices 55a, 55b of per se known type. In the illustrated case, the threshold devices are in the form of comparators with two inputs, the first inputs 55a' and 55b' respectively, being connected to the output 54b on the amplifier 54. The inputs 55a'' and 55b'' are each connected to their reference voltage which is realized by battery B' and B'', respectively. Hence, the input 55a' is referenced to plus potential and the input 55b' to minus potential.

When incoming signals on the inputs 55a' and 55b', respectively, exceed a certain amplitude preset by means of the reference voltage on 55a'' and 55b'', respectively, signals are provided on the outputs 55a''' and 55b''', respectively, of the comparator 55a and 55b. In brief, the apparatus functions as follows. Upon receipt of an incoming strobe 50 from the direction R1, the receiver 52 is activated, the pulse P1 then occurs in detector 52''. This pulse is amplified in the amplifier 54. The amplified pulse is impressed upon the input 55a'. If the amplitude in the pulse P1 exceeds a predetermined level, a signal will be obtained on the output 55a'''. Using this signal, it is thus possible to single out the receiver section 52 as being activated on this particular occasion.

If, instead, a strobe 51 occurs in the direction R2, the receiver section 53 will be correspondingly activated detector 53'' then provides the pulse P2. This latter pulse has a sign which is opposed to the sign of the pulse P1. The pulse P2 is amplified correspondingly in the amplifier 54 and the amplified pulse is impressed upon the input 55b'. Correspondingly, the threshold 55b emits a signal on the output 55b'''. The activated output thus singles out the receiver section 53 every time it is activated by an incoming strobe 51.

The single-out function may also be employed within the missile for controlling its internal functions.

In that the pulses P1 and P2 have opposite senses directed in relation to one another, a subtraction effect of the return dispersion will be obtained in the illustrated connection. This makes for greater possibilities to realize a higher signal/background contrast relationship.

The present invention should not be considered as restricted to that described above and shown on the drawings, many modifications being conceivable without departing from the spirit and scope of the appended claims.

What we claim and desire to secure by Letters Patent is:

1. A proximity fuse for a unit in the form of a missile, projectile or the like and comprising transmitter means for emitting electromagnetic radiation in a plurality of part lobes, receiver means for receiving the radiation which is reflected from a proximally adjacent target, and signal processing means for processing an electric signal initiated by the received radiation, wherein said transmitter and receiver means are operative to work with a plurality of narrow part lobes distributed in dense configuration about the circumference of the unit, each of said narrow part lobes respectively impinging in their entirety upon the target; and wherein said receiver means are operative to discern the reflected and received radiation of each respective part of lobe for individual processing in said signal processing means.

2. The proximity fuse as claimed in claim 1, further comprising:
a plurality of drive units; and
wherein said transmitter means are disposed in a full-circle emitting lobe system in which said transmitter means are divided into first transmitter means groups each of which being drivable by a corresponding one of said drive units; and
wherein said transmitter means within each first group are divided, preferably symmetrically, about the circumference of the proximity fuse.

3. The proximity fuse as claimed in claim 2, wherein said drive units feed their respective first transmitter means groups with short time-offsets pulses such that transmitter means forming mutually adjacent groups and other transmitter groups which, with their part lobes, cover a sector of the full-circle sensing of said proximity fuse seen in a cross-sectional plane through the unit to effectuate a series-pulsed emission of their part lobes.

4. The proximity fuse as claimed in claim 2, wherein said drive units actuate their respective first transmitter means groups via electrically operating transmission lines.

5. The proximity fuse as claimed in claim 1, wherein said receiver means comprises receiver devices disposed in a full-circle sensing system in which said receiver devices are distributed in a plurality of sub-receiver devices each of which being coupled to a corresponding signal processing circuit; and that the sub-receiver devices are distributed, preferably symmetrically, about the circumference of said proximity fuse.

6. The proximity fuse as claimed in claim 3, further comprising a plurality of subreceiver devices;
wherein each respective subreceiver device is allocated its second transmitter means group; and that each respective subreceiver device is directed in the same direction as the transmitter means in the associated second transmitter means group.

7. The proximity fuse as claimed in claim 3, further comprising:
sensing means for determining, by sensing/comparison of the time offset of said transmitter means and the activation of said receiver means by receiver reflected radiation, that part lobe among all part lobes which may be related to the radiation received on the immediate occasion in the considered receiver means.

8. The proximity fuse as claimed in claim 7, wherein first sensing means are connected to interstices in a matrix to whose columns said drive units are connected, and to whose lines said receiver means are connected, or vice versa.

9. The proximity fuse as claimed in claim 1, wherein the number of transmitter means substantially exceeds the number of receiver means.

10. The proximity fuse as claimed in claim 1, wherein each respective transmitter means is disposed to emit lobes of such narrow lobe angles that one individual lobe will, in its entirety, be accommodated on a minimum target which is detectable even when it is located at maximum detection range.

11. The proximity fuse as claimed in claim 1, wherein said transmitter means are operative to emit lobes of mutual angles of distribution of such sizes that at least one lobe will impinge upon the smallest target which is detectable when it is at maximum detection range.

12. The proximity fuse as claimed in claim 3, wherein said drive units actuate their respective first transmitter means groups via electrically operating transmission lines.

13. The proximity fuse as claimed in claim 2, wherein said receiver means comprises receiver devices disposed in a full-circle sensing system in which said receiver devices are distributed in a plurality of subreceiver devices which are each coupled to a corresponding signal processing circuit; and that the subreceiver devices are distributed, preferably symmetrically, about the circumference of said proximity fuse.

14. The proximity fuse as claimed in claim 3, wherein said receiver means comprises receiver devices disposed in a full-circle sensing system in which said receiver devices are distributed in a plurality of subreceiver devices which are each coupled to a corresponding signal processing circuit; and that the subreceiver devices are distributed, preferably symmetrically, about the circumference of said proximity fuse.

15. The proximity fuse as claimed in claim 4, further comprising a plurality of subreceiver devices;
wherein each respective subreceiver device is allocated its second transmitter means group; and that each respective subreceiver device is directed in the same direction as the transmitter means in the associated second transmitter means group.

16. The proximity fuse as claimed in claim 2, wherein the number of transmitter means substantially exceeds the number of receiver means.

17. The proximity fuse as claimed in claim 3, wherein the number of transmitter means substantially exceeds the number of receiver means.

18. The proximity fuse as claimed in claim 2, wherein each respective transmitter means is disposed to emit lobes of such narrow lobe angles that one individual lobe will, in its entirety, be accommodated on a minimum target which is detectable even when it is located at maximum detection range.

19. The proximity fuse as claimed in claim 3, wherein each respective transmitter means is disposed to emit lobes of such narrow lobe angles that one individual lobe will, in its entirety, be accommodated on a minimum target which is detectable even when it is located at maximum detection range.

20. The proximity fuse as claimed in claim 2, wherein said transmitter means are operative to emit lobes of mutual angles of distribution of such sizes that at least one lobe will impinge upon the smallest target which is detectable when it is at maximum detection range.

21. The proximity fuse as claimed in claim 3, wherein said transmitter means are operative to emit lobes of mutual angles of distribution of such sizes that at least one lobe will impinge upon the smallest target which is detectable when it is at maximum detection range.

22. The proximity fuse as claimed in claim 2, wherein said drive units actuate their respective first transmitter means groups via optically operating transmission lines.

23. The proximity fuse as claimed in claim 1, wherein said receiver means comprises receiver devices disposed in a full-circle sensing system in which said receiver devices are distributed in a plurality of subreceiver devices each of which being coupled to a common signal processing circuit; and that the subreceiver devices are distributed, preferably symmetrically, about the circumference of said proximity fuse.

24. The proximity fuse as claimed in claim 2, wherein the number of transmitter means substantially exceeds the number of drive means.

25. The proximity fuse as claimed in claim 3, wherein said drive units actuate their respective first transmitter means groups via electrically operating transmission lines.

26. The proximity fuse as claimed in claim 2, wherein said receiver means comprises receiver devices disposed in a full-circle sensing system in which said receiver devices are distributed in a plurality of subreceiver devices which are each coupled to a common signal processing circuit; and that the subreceiver devices are distributed, preferably symmetrically, about the circumference of said proximity fuse.

27. The proximity fuse as claimed in claim 3, wherein said receiver means comprises receiver devices disposed in a full-circle sensing system in which said receiver devices are distributed in a plurality of subreceiver devices which are each coupled to a common signal processing circuit; and that the subreceiver devices are distributed, preferably symmetrically, about the circumference of said proximity fuse.

28. The proximity fuse as claimed in claim 4, wherein the number of transmitter means substantially exceeds the number of drive means.

29. The proximity fuse as claimed in claim 3, wherein the number of transmitter means substantially exceeds the number of drive means.

30. An optical receiver intended for a unit in the form of a missile, projectile, or the like, for receiving two or more reflected optical strobes of different angles of incidence towards the unit, wherein the receiver includes two pairwise cooperable receiver units which are each allocated their strobe or group of strobes; that the two receiver units are connected to an electric signal initiation circuit, which, in response to reception, by the receivers, of each respective strobe, generates electric signals representative of each respective receiver unit; and that means sensing said signals indicate that one of said receiver units which is actuated, on the occasion in question, by the relevant strobe.

31. The receiver as claimed in claim 30, wherein the receiver units are operative to receive narrow strobes and are allocated such mutual disposition in a cross-sectional plane through the unit that the one receiver unit has its major direction directed beside a maximum target detectable by the other receiver unit.

32. The receiver as claimed in claim 31, wherein the two receiver units are of mutual placement in the cross-sectional plane through the unit which lies between $\pm 90°$–$180°$ and is preferably approximately $\pm 180°$.

33. The receiver as claimed in claim 30 wherein the receiver operates with electric signals in the form of pulses.

34. The receiver as claimed in claim 30, wherein the receiver is divided into two or more pairs of receiver units; and that said pairs of receiver units operate independently of one another.

35. The receiver as claimed in claim 31, wherein the receiver operates with electric signals in the form of pulses.

36. The receiver as claimed in claim 32, wherein the receiver operates with electric signals in the form of pulses.

37. The receiver as claimed in claim 31, wherein the receiver is divided into two or more pairs of receiver units; and that said pairs of receiver units operate independently of one another.

38. The receiver as claimed in claim 32, wherein the receiver is divided into two or more pairs of receiver units; and that said pairs of receiver units operate independently of one another.

39. An optical receiver intended for a unit in the form of a missile, projectile, etc., for receiving two or more reflected optical strobes of different angles of incidence towards the unit, wherein the receiver includes two pairwise cooperable receiver units which are each allocated their strobe or group of strobes; that the two receiver units are connected to an electric signal initiation circuit by means of photodetection means, which, in response to reception, by the receivers, of each respective strobe, generates electric signals representative of each respective receiver unit; and that means sensing said signals indicate that one of said receiver units which is actuated, on the occasion in question, by the relevant strobe, the photodetection means included in said receiver units being interconnected in the signal initiation circuit such that the signals initiated by intermediary of each respective receiver unit occur with different signs.

40. The receiver as claimed in claim 39, wherein said photodetector means comprises first and second photodetector devices each having an anode and cathode, the anode (A1) in the first photodetector device being interconnected in an interconnection point (S) with the cathode in the second photodetector device, the cathode in the first photodetector device being connected to a plus potential, and the anode in the second photodetector device being connected to a minus potential.

41. The receiver as claimed in claim 40, wherein said sensing means comprises a signal sensing device connected to the interconnection point (S) and;
wherein said signal sensing device comprises two parallel-disposed threshold devices each allocated to a respective receiver unit.

42. The receiver as claimed in claim 41, wherein the threshold devices, disposed in parallel, sense, by the intermediary of their first inputs occurring signals and have their other inputs coupled to such potentials that the first threshold device reacts to a signal (P1) occasioned by the first receiver unit, and the second threshold device reacts to a signal (P2) occasioned by the second receiver unit, indication of the activated receiver unit consisting of activation of the output of the corresponding threshold device.

43. The receiver as claimed in claim 42, wherein there is connected, between the interconnection point (S) and said threshold devices, an amplifier device preferably of the operational amplifier type.

44. The receiver as claimed in claim 39, wherein the receiver operates with electric signals in the form of pulses.

45. The receiver as claimed in claim 40, wherein the receiver operates with electric signals in the form of pulses.

46. The receiver as claimed in claim 41, wherein the receiver operates with electric signals in the form of pulses.

47. The receiver as claimed in claim 42, wherein the receiver operates with electric signals in the form of pulses.

48. The receiver as claimed in claim 43, wherein the receiver operates with electric signals in the form of pulses.

49. The receiver as claimed in claim 39, wherein the receiver is divided into two or more pairs of receiver units; and that said pairs of receiver units operate independently of one another.

50. The receiver as claimed in claim 40, wherein the receiver is divided into two or more pairs of receiver units; and that said pairs of receiver units operate independently of one another.

51. The receiver as claimed in claim 41, wherein the receiver is divided into two or more pairs of receiver units; and that said pairs of receiver units operate independently of one another.

52. The receiver as claimed in claim 42, wherein the receiver is divided into two or more pairs of receiver units; and that said pairs of receiver units operate independently of one another.

53. The receiver as claimed in claim 43, wherein the receiver is divided into two or more pairs of receiver units; and that said pairs of receiver units operate independently of one another.

* * * * *